United States Patent [19]
Nagano et al.

[11] Patent Number: 5,712,834
[45] Date of Patent: Jan. 27, 1998

[54] CONTROL APPARATUS FOR DATA REPRODUCTION AND RECORDING DEVICES

[75] Inventors: Naoki Nagano; Harumi Kawamura, both of Tokyo; Hisato Shima, Chiba, all of Japan

[73] Assignee: Sony Corporation, Japan

[21] Appl. No.: 598,130

[22] Filed: Feb. 7, 1996

Related U.S. Application Data

[63] Continuation of Ser. No. 426,463, Apr. 19, 1995, abandoned, which is a continuation of Ser. No. 262,039, Jun. 17, 1994, abandoned, which is a continuation of Ser. No. 9,789, Jan. 27, 1993, abandoned, which is a division of Ser. No. 728,985, Jul. 12, 1991, abandoned.

[30] Foreign Application Priority Data

| Jul. 19, 1990 | [JP] | Japan | 2-191151 |
| Jul. 23, 1990 | [JP] | Japan | 2-194192 |
| Jul. 27, 1990 | [JP] | Japan | 2-200094 |

[51] Int. Cl.$^6$ .................................................. G11B 31/00
[52] U.S. Cl. ................ 369/19; 364/916; 340/825.24
[58] Field of Search ............................. 369/19, 1, 2, 20, 369/32, 24, 30, 33; 364/916, 927.9, 940, 940.1, 940.3, DIG. 2; 340/825.07, 825, 825.24, 825.25

[56] References Cited

U.S. PATENT DOCUMENTS

| 4,322,747 | 3/1982 | Dischert et al. | 358/127 |
| 4,443,866 | 4/1984 | Burgiss, Sr. | 364/916 |
| 4,598,287 | 7/1986 | Osakabe et al. | 340/825.24 |
| 4,635,121 | 1/1987 | Hoffman et al. | 369/19 X |
| 4,855,730 | 8/1989 | Venners et al. | 340/825.24 |
| 5,027,232 | 6/1991 | Sekii et al. | 360/74.1 |
| 5,097,461 | 3/1992 | Majima | 369/84 |
| 5,119,242 | 6/1992 | Murray | 360/14.2 |

FOREIGN PATENT DOCUMENTS

| 0 191 473 | 8/1986 | European Pat. Off. . |
| 0 336 708 | 10/1989 | European Pat. Off. . |
| 08/379358 | of 0000 | WIPO . |

*Primary Examiner*—Ali Neyzari
*Attorney, Agent, or Firm*—Limbach & Limbach LLP

[57] ABSTRACT

An apparatus for controlling a plurality of recording and reproducing apparatus in which a time elapse measuring means can be reset and read by a control means to measure the elapse time. The control means also receives position information of the recording or reproducing medium from an output means. The control means can execute operation commands at times in response to the measured time elapse.

4 Claims, 6 Drawing Sheets

CONTROL APPARATUS FOR DATA REPRODUCTION AND RECORDING DEVICES

This is a continuation of application Ser. No. 08/426,463 filed on Apr. 19, 1995, now abandoned which is a continuation application of application Ser. No. 08/262,039 filed on Jun. 17, 1994, abandoned, which is a continuation application of application Ser. No. 08/009,789 filed on Jan. 27, 1993, abandoned, which is a divisional application of application Ser. No. 07/728,985 filed Jul. 12, 1991, abandoned.

BACKGROUND OF THE INVENTION

1. Field of the Invention

The present invention relates to an apparatus for connecting electronic appliances, a control apparatus and an address setting method suitable for collectively controlling a plurality of electronic appliances such as audio visual appliances or the like.

2. Description of the Prior Art

In a data transmission system according to the RS-232C standard, it is known that operation of audio and visual appliances (hereinafter simply referred to as AV appliances) can be controlled by a computer, such as a personal computer or the like.

According to the RS-232C standard, various data are transmitted and received in a manner so that the computer and the AV appliances are placed in a one-to-one relation. Therefore, in the case of a system in which a plurality of AV appliances are controlled by a single computer (control apparatus), the computer side must include an RS-232C standard terminal corresponding to each of the AV appliances, or special change-over switches for switching the data transmission to the respective AV appliances must be employed. Accordingly, there is then the problem that the system cannot be used well for various purposes because the number of terminals or the switching ability of the change-over switches (the number of the change-over switches) must be changed with the increase or decrease of the AV appliances.

It is also proposed that a plurality of AV appliances can be controlled by utilizing a bus line used in a so-called local network system. This proposal, however, has the following disadvantages. For example, when two or more different data are simultaneously transmitted, detection of such data becomes complicated (troublesome) and the transmission processing of such data also becomes complicated, which unavoidably makes the interface housed within the AV appliance large-sized and expensive.

Further, it is conventional to connect a plurality of controlled apparatus (electronic appliances such as AV appliances) in series (in a daisy chain fashion) to a control apparatus such as a controller or the like. The respective AV appliances are controlled in operation by this controller. In such a system, addresses are allocated (set) to the respective AV appliances and a command signal for commanding the operation of the particular AV appliance is transmitted to the particular AV appliance together with the address from the controller. Accordingly, addresses to allocated to the respective AV appliances must be made different.

In order to remove this disadvantage, it is proposed that addresses are allocated to different categories of AV appliances (e.g., categories of television receiver, a video tape recorder, a television camera and so on). This proposal, however, has the disadvantage that, if two video tape recorders are provided, then addresses for identifying these two video tape recorders cannot be allocated.

It has also been proposed that respective AV appliances be provided with dip switches or the like, so that addresses can be set by manipulating the dip switches. However, this proposal makes the arrangement of the AV apparatus complicated and addresses must be set in a manual fashion. As a consequence, if the number of AV appliances is increased, then the addressing setting becomes considerably troublesome.

OBJECTS AND SUMMARY OF THE INVENTION

Accordingly, it is an object of the present invention to provide an improved apparatus for connecting electronic appliances in which the aforementioned shortcomings and disadvantages encountered with the prior art can be eliminated.

More specifically, it is an object of the present invention to provide an apparatus for connecting electronic appliances in which, even if there is only a single RS-232C standard terminal, a plurality of electronic appliances can be controlled by single control apparatus in a systematized fashion (i.e., collectively).

It is another object of the present invention to provide an address setting method in which the controlled apparatus can be set to different addresses only by supplying address setting signals to the controlled apparatus from a control apparatus.

As an aspect of the present invention, an apparatus for connecting electronic appliances is provided, in which a plurality of electronic appliances are connected in series so as to transmit and receive information signals and predetermined control signals and transmission and reception of the information signals is collectively controlled by a desired control apparatus. This apparatus for connecting electronic appliances is comprised of a first terminal to or from which the information signals and the predetermined control signals are input from or output to another connecting apparatus connected to a preceding stage. There is also a second terminal to or from which the information signals and the predetermined control signals are input from or output to another connecting apparatus of a succeeding stage. There is also a signal line through which the information signals input thereto from the first terminal are output to the second terminal. There is also a switching unit for selectively allowing either information signals transmitted on a second line, or information signals supplied to the switching unit from a connecting apparatus of the succeeding stage through the second terminal, to be output from the first terminal. There is also a control signal generating unit for generating a predetermined control signal which is input to a preceding connecting apparatus. There is also a control means for controlling the switching operation of the switching unit So that, when the predetermined control signal has been received from the control signal generating unit, an information signal input through the second terminal is output from the first terminal, while when the predetermined control signal has not been received from the control signal generating unit, an information signal transmitted on the second line is output from the first terminal.

According to the apparatus for connecting electronic appliances of the present invention, under the condition that the plurality of electronic appliances are connected in series so as to transmit and receive information signals and predetermined control signals, the transmission and reception of the information signals can be collectively controlled by a desired control apparatus.

Further, on the basis of the existence or absence of a predetermined control signal generated from the control signal generating unit, it is determined whether or not another connecting apparatus is connected to the connecting apparatus. If another connecting apparatus is not connected, then the information signal transmitted to the connecting apparatus of the final stage can be fed back to the control apparatus which initially outputs the information signal or to another control apparatus by the switching operation of the switching unit.

As a second aspect of the present invention, an address setting method is provided, in which a plurality of controlled apparatus which can transmit and receive various signals between them and a desired control apparatus are connected in series to a control apparatus, various signals transmitted to the controlled apparatus of the final stage through the respective controlled apparatus are fed through a signal line back to the control apparatus and particular addresses n are set to the respective controlled apparatus. According to this address setting method, when an address setting signal is supplied to a desired controlled apparatus from the control apparatus, the address setting signal is sequentially processed in a predetermined manner by a desired controlled apparatus and a controlled apparatus connected to the succeeding stage of the desired controlled apparatus.

Therefore, the processing for allocating particular addresses to the respective controlled apparatus is introduced into the predetermined processing executed in the respective controlled apparatus, whereby different addresses are allocated to the respective controlled apparatus.

The above and other objects, features, and advantages of the present invention will become apparent in the following detailed description of illustrative embodiments thereof to be read in conjunction with the accompanying drawings, in which like reference numerals are used to identify the same or similar parts in the several views.

BRIEF DESCRIPTION OF THE PREFERRED EMBODIMENTS

DETAILED DESCRIPTION OF THE PREFERRED EMBODIMENTS

Figure 1:
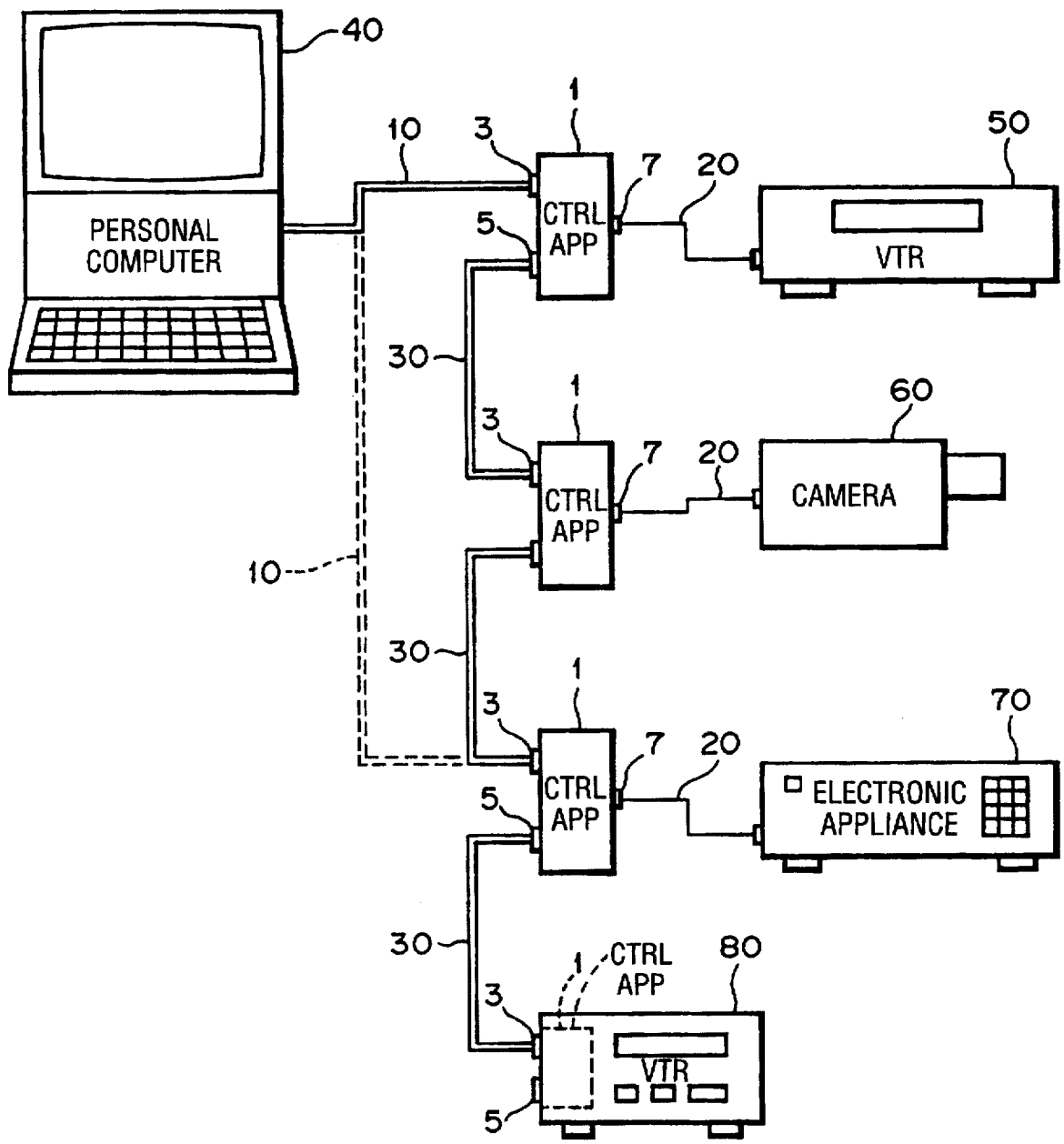
FIG. 1 is a schematic diagram showing an overall arrangement of an embodiment of an apparatus for connecting electronic appliances according to the present invention.

Referring to the drawings in detail and, initially to FIG. 1, an apparatus 1 to which the present invention is applied will be described hereinafter.

As shown in FIG. 1, the apparatus 1 includes first and second terminals 3 and 5. Through the first terminal 3, signals are transmitted and received between the apparatus 1 and a desired control apparatus 40 (which can be a personal computer). Signals are transmitted between the apparatus 1 and a second apparatus 1 via a cable 30. Through the terminal 3 of the second apparatus, signals are transmitted and received between the first apparatus 1 and the second apparatus 1 via the cable 30 and the terminal 5 of the first apparatus.

Each apparatus 1 is connected, for example, to a video tape recorder (VTR) 50, a video tape recorder having a built-in camera 60, or another electronic appliance 70 by means of a cable 20, or the apparatus 1 is housed in a video tape recorder 80.

The apparatus 1 are connected serially, and the video tape recorder 50 and other electronic appliances are collectively controlled by the personal computer 40 via the apparatus 1.

Let us describe the case in which electronic appliance 70 and the video tape recorder 80 are controlled by the personal computer 40 in the connected states shown by dashed lines 10 in FIG. 1.

Figure 2:
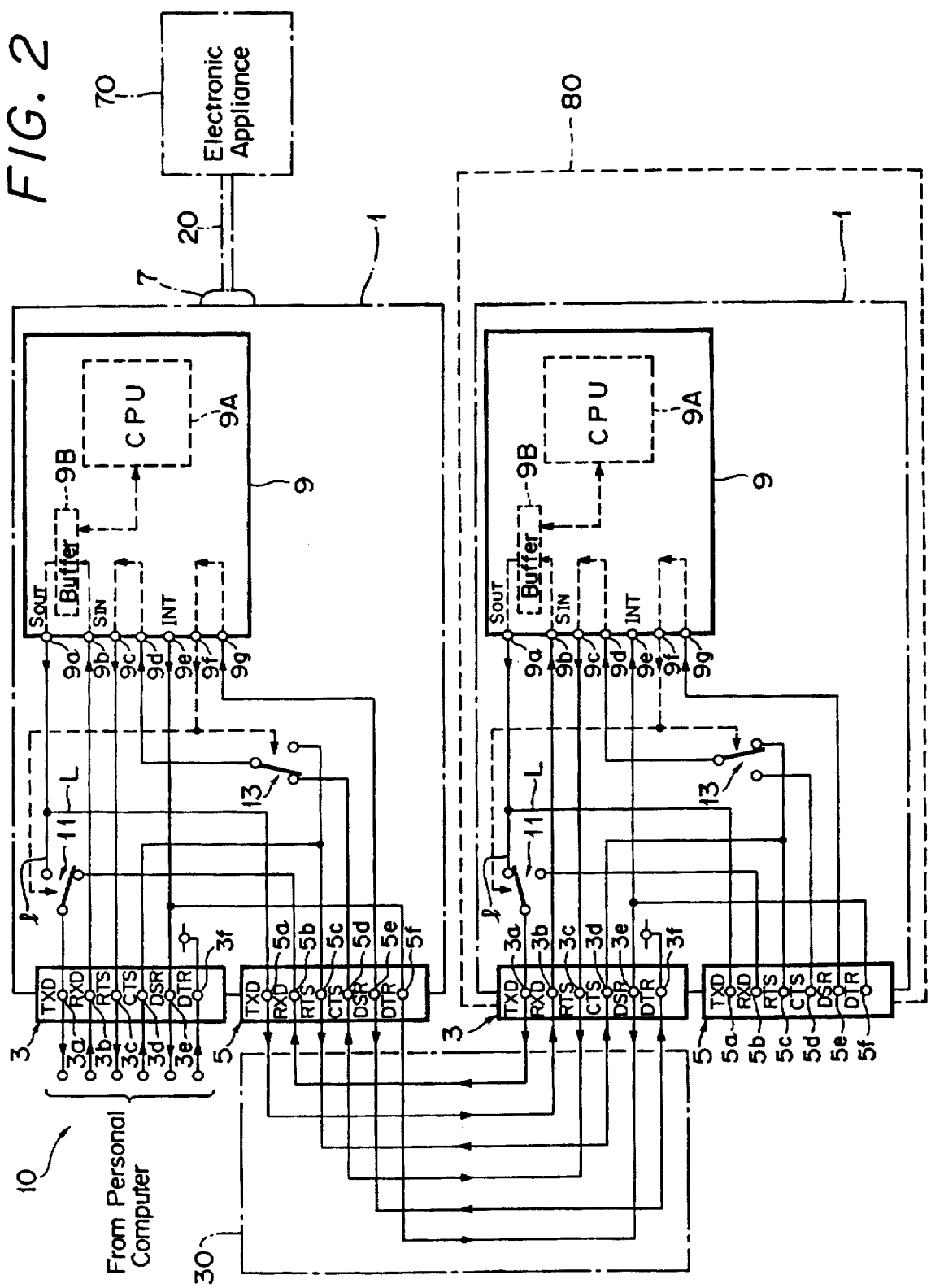
FIG. 2 is a schematic diagram showing an electrical arrangement of a main portion of the apparatus shown in FIG. 1.

FIG. 2 shows an electrical arrangement of a main portion of the apparatus shown in FIG. 1. Referring to FIG. 2, in the first and second terminals 3 and 5, data signal input and output ports 3a, 3b, 5a, 5b and control signal input and output ports 3c through 3f and 5c through 5f are provided in parallel to one another.

A data signal from the personal computer 40 is supplied to the input port 3b, from which it is delivered to a port (SIN) 9b of a microcomputer 9 mainly made of a central processing unit (CPU) 9A or the like and is then stored in a buffer 9B.

Figure 3:
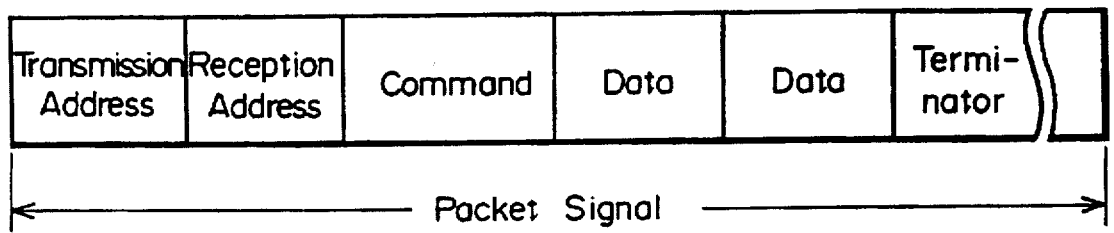
FIG. 3 is a schematic diagram showing an arrangement of a packet signal used in an embodiment of the present invention.

The data signal is supplied in the form of a packet signal and the packet signal is formed of a set of at its head a transmission address, a reception address (each apparatus 1 has the transmission and reception addresses), a command (control content), various data and a terminator, in that order, as shown in FIG. 3.

Referring back to FIG. 2, the packet signal stored in the buffer 9B is processed by the CPU 9A in processing manner which will be described later and is delivered from the port (SOUT) 9a.

A switching unit 11 is interposed between the ports 9a and 3a so as to selectively connect the output port 3a to port 9a or port 5b.

The switching unit 11 short-circuits the ports 3a and 5b when a second apparatus 1 is connected to the rear stage of the first apparatus 1, and short-circuits the ports 3a and 9a when the second apparatus 1 is not connected to the rear stage of the first apparatus 1.

More specifically, when the second (succeeding) apparatus 1 is connected to terminal 5 of the first apparatus 1, a voltage of high level (e.g., 5v) is applied to the port 3f of the succeeding apparatus 1 and this voltage is supplied through the port 3f of the succeeding apparatus and port 5e of the first apparatus 1 to the port 9g of microcomputer 9 (of the first apparatus 1) so that microcomputer 9 allows a switch change-over control signal to be produced from the port 9f under the condition such that the input voltage applied to the port 9g is high in level. Thus, the switching unit 11 of the first apparatus 1 is changed in position (control means) so that the ports 3a and 5b are short-circuited by the above control signal (condition 1).

When the succeeding apparatus 1 is not connected to terminal 5 of the first apparatus 1, the voltage applied to the ports 5e and 9g of the first apparatus is low in level so that the switching unit 11 short-circuits the ports 3a and 9a (condition 2). In that event, the packet signal from the port 9a is delivered to the port 5a through a signal line L and is also delivered to the port 3a through a signal line "l" diverged from the signal line L.

When the voltage at the port 9g is high in level (i.e., when the succeeding apparatus 1 is connected to terminal 5 of the first apparatus 1), the ports 5d and 9d are short-circuited by a switching unit 13, while when that voltage is low in level (i.e., when the succeeding apparatus 1 is not connected to terminal 5 of the first apparatus 1), the ports 3d and 9d are short-circuited by the switching unit 13. In the latter case, the control signal input from the port 3d of the apparatus 1 of the final stage is supplyed through the ports 9d, 9c and 3c to the port 5d of the apparatus 1 of the preceding stage.

Further, this control signal is fed through the ports 5d, 9d, 9c and 3c in the apparatus 1 of the preceding stage back to the personal computer 40. The control signal thus fed back to the personal computer 40 is used to determine whether or not each apparatus 1 is ready for receiving data from the personal computer 40.

An interrupt processing control signal is asserted by the first apparatus 1 from the port 3e and latched in a port (INT) of the personal computer 40. Further, this control signal diverged from the port 3e is latched through the ports 5f (of the first apparatus 1) and 3e (of the succeeding apparatus 1) to the port 9e of the succeeding apparatus 1.

In the thus constructed first apparatus 1 (the apparatus 1 of the preceding stage), the packet signal from the personal computer 40 is input from the port 3b and stored in the buffer 9B, in which it is processed in a predetermined processing manner and then input to the port 3b of the apparatus 1 of the succeeding stage through the ports 9a and 5a and the cable 30.

In case the apparatus 1 of the succeeding stage is the apparatus 1 of the final stage, then the packet signal from the port 9a (of the apparatus 1 of the final stage) is input through the port 3a and the cable 30 to the port 5b of the apparatus 1 of the preceding stage and fed through the port 3a back to the personal computer 40.

More specifically, when the personal computer 40 derives the packet signal, this packet signal is temporarily stored in the buffer 9B of each microcomputer 9, in which it is processed by the CPU 9A in a predetermined processing manner, if necessary, and then transmitted to the apparatus 1 of the succeeding stage. The packet signal transmitted to the apparatus 1 of the final stage is again fed back to the personal computer 40.

Accordingly, by performing a predetermined operation in the personal computer 40, the packet signal is transmitted to all the apparatus 1 and, if necessary, then the apparatus 1 controls operation of the electronic appliance 70 and the video tape recorder 80 in accordance with the packet signal.

The procedure executed by the CPU 9A in accordance with the packet signal stored in the buffer 9B will be described below with reference to a flowchart forming FIG. 4.

Figure 4:
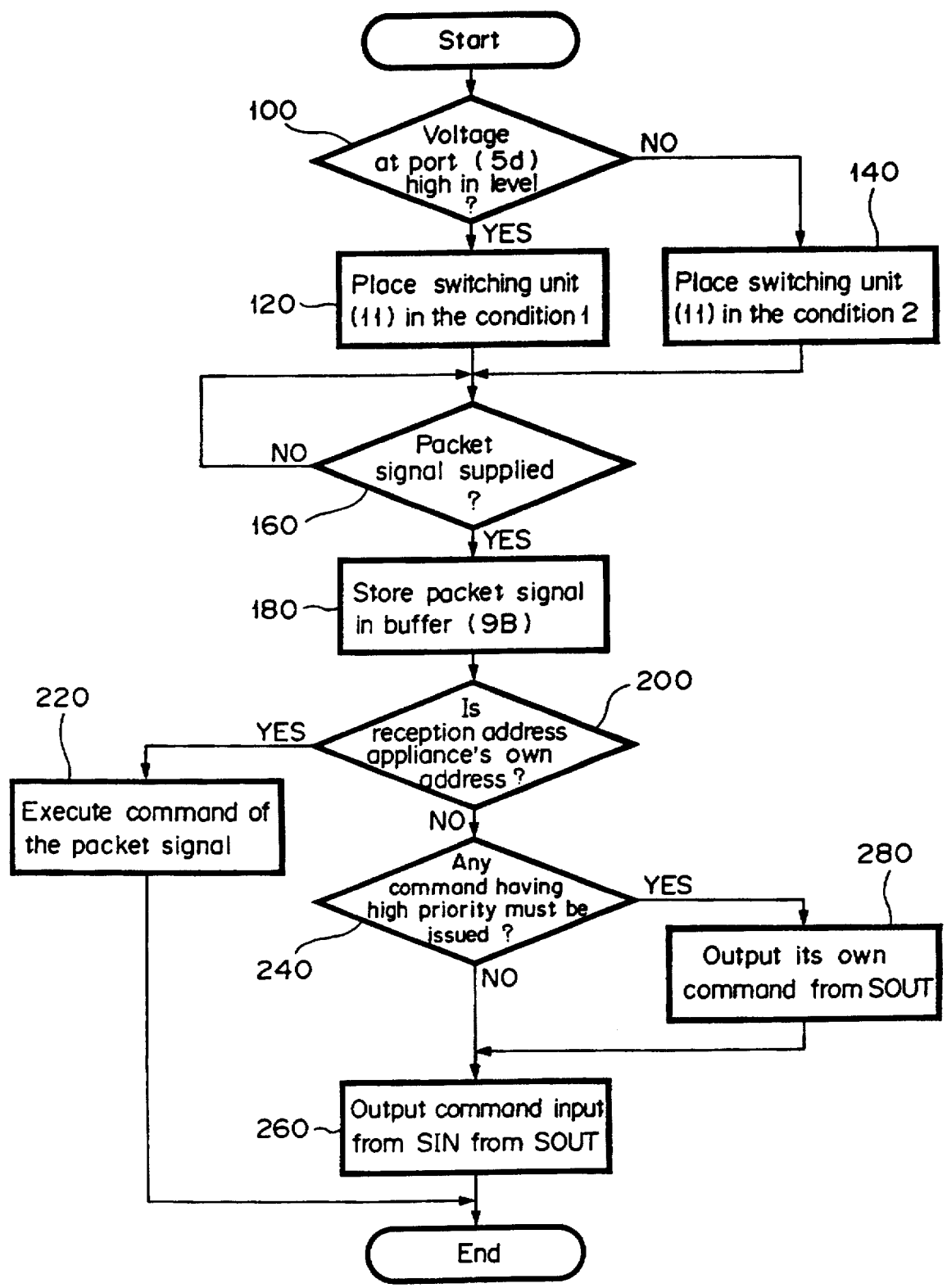
FIG. 4 is a flowchart to which references will be made in explaining the procedure executed by a central processing unit (CPU) of the connecting apparatus of an embodiment of the present invention.

Referring to FIG. 4, following the start of operation, it is determined in the next decision step 100 whether or not the voltage at the port 5d is high in level. If the voltage at the port 5d is high in level as represented by a YES at decision step 100, then the processing proceeds to step 120, whereat the switching unit 11 is placed in the condition 1 (i.e., the ports 3a and 5b are short-circuited). If the voltage at the port 5d is low in level as represented by a NO at decision step 100, then the processing proceeds to step 140, whereat the switching unit 11 is placed in the condition 2 (i.e., the ports 3a and 9a are short-circuited).

Then, it is determined in the next decision step 160 whether or not a packet signal is input from the port 9b. If the packet signal is supplied from the port 9b, then the processing proceeds to step 180 the input packet signal is stored in the buffer 9B.

It is determined in the next decision step 200 whether or not the reception address is its own address (address of the apparatus 1 itself). If the reception address is apparatus's own address as represented by a YES at decision step 200, then the processing proceeds to step 220, whereat the command of the packet signal is executed. If the electronic appliance 70 is the video tape recorder, then operation control such as starting the recording operation or the like is performed.

If the reception address is not the apparatus's own address as represented by a NO at decision step 200, then the processing proceeds to the next decision step 240. It is determined in decision step 240 whether or not any command having a priority over the command from the personal computer 40 must be issued to another apparatus 1 from the apparatus 1. If such command must be issued to another apparatus 1 as represented by a YES at decision step 240, then the command (transmission command) is output from the port 9a and the packet signal from the personal computer 40 is output at steps 280 and 260.

As described above, according to this embodiment, the packet signal input from the personal computer 40 is sequentially latched in each respective apparatus 1 and each respective apparatus 1 is provided with a microcomputer 9 for controlling the operation of electronic appliance 70 or video tape recorder 80 (or another appliance) so that, even when the personal computer 40 is provided with only one RS-232C standard terminal, a plurality of electronic appliances are collectively controlled as a system via the serially connected apparatus 1.

Further, when the number of electronic appliances is increased, then merely by connecting additional apparatus 1, the electronic appliances including the increased electronic appliances are all controlled as a system. This enables the system to be conveniently reconfigured for use in a variety of applications.

Furthermore, since the packet signal is temporarily stored in the buffer 9B and the priority order of the packet signals to be transmitted to the apparatus 1 of the succeeding stage is identified, any trouble that has occurred in the data transmission can be detected and avoided by an apparatus of simple arrangement, and the manufacturing cost of the apparatus 1 can be also reduced.

Incidentally, the apparatus 1 itself may be utilized as the source (desired control apparatus) which transmits the packet signal and, depending on the arrangement of the packet signal, all the apparatus 1 (or electronic appliances controlled by the apparatus 1) may be utilized as the source which transmits the packet signal, thus making it possible to construct a so-called multi-master system using the inventive hardware.

As will be understood from the above description, in the apparatus for connecting electronic appliances according to the present invention, under the condition that the plurality of connecting apparatus are connected in series so as to transmit and receive a packet signal and a predetermined control signal, the transmission and reception of the packet signal can be collectively controlled by the desired control apparatus.

Further, on the basis of the existence or absence of the predetermined control signal generated from the control signal generating unit, it is determined whether or not other connecting apparatus are connected to the connecting apparatus. If no succeeding connecting apparatus is connected, then the information signal transmitted to the connecting apparatus of the final stage can be fed back to the control apparatus which initially outputs the information signal or to another control apparatus by the switching operation of the switching unit.

Accordingly, even when the control apparatus is provided with only one RS-232C standard terminal, the signal output from the control apparatus is sequentially input to the connecting apparatus, whereby the respective electronic appliances are collectively controlled by the control apparatus through the connecting apparatus.

Furthermore, when more electronic appliances are connected, more connecting apparatus may be provided, which can cope with the expanded system readily.

An embodiment of an address setting method according to the present invention will be described next with reference to the drawings.

Figure 5:
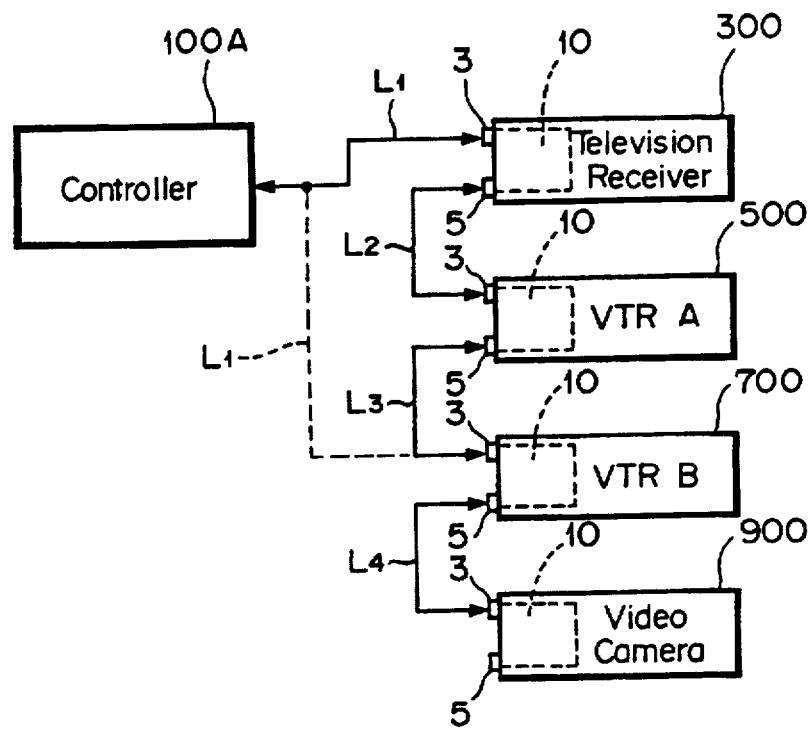
FIG. 5 is a schematic diagram showing an arrangement of a system used in an embodiment of an address setting method according to the present invention.

FIG. 5 schematically illustrates the system to which the present invention is applied.

As FIG. 5 shows, controlled apparatus (television receiver 300, video tape recorder "A" 500, video tape recorder "B" 700, and video camera 900) are serially connected to a controller (control apparatus) 100A. Each controlled apparatus houses a transmitting and receiving apparatus 10 to transmit and receive a signal between it and the controller 100A or other controlled apparatus.

Transmitting and receiving apparatus 10 is mainly formed of a microcomputer or the like. The apparatus 10 housed, for example, in VTRA 500 performs a predetermined processing on the basis of transmitted data or the like, transmitting processed data to the VTRB 700 and also performs control processing, such as reproducing operation and recording operation of the VTRA 500, etc.

Controller 100A, television receiver 300, VTRA 500, VTRB 700, and video camera 900 are sequentially connected through two-way communication lines L1, L2, L3, and L4, and the output signal of the video camera 900 is fed through communication lines L1, L2, L3, and L4 back to the controller 100A.

The apparatus 10 are serially connected in sequence as described above and the electronic appliances such as the television receiver 300 or the like are collectively controlled by the controller 100A via the apparatus 10 provided in the respective electronic appliances.

Let us now consider the case such that VTRB 700 and video camera 900 are controlled by the controller 100A in the connected state shown in FIG. 1. At that time, the arrangement and operation of each apparatus 10 is exactly the same as those of apparatus 1 shown in FIG. 2. Accordingly, by performing a predetermined operation in the controller 100A, a packet signal is transmitted to each apparatus 10 and relevant ones of apparatus 10 drive VTRB 700 and video camera 900 in accordance with the packet signal, if necessary.

The system of FIG. 5 is constructed as described above, and a method for setting an address to each of the controlled appliances will be described below.

In the FIG. 5 embodiment, we shall first explain the case that the address is not set in the initial state. In this case, if the address of, for example, television receiver 300 is understood by the controller 100A side, then a command (in the form of a packet signal) may be transmitted to that address.

Figure 6:
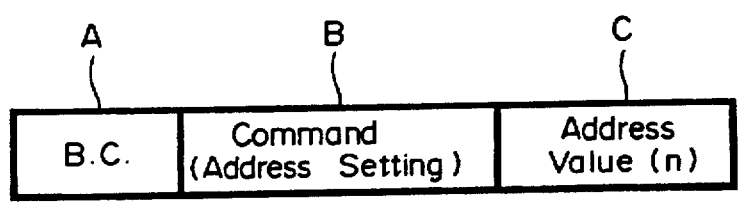
FIG. 6 is a schematic diagram showing an arrangement of a command used in the above embodiment.

As is understood from FIG. 6, a broadcast command (command "B.C." occupying area A of FIG. 6) is used to access address in order to transmit the following data (including the address setting command occupying area B) to all controlled apparatus. A command (the address value command occupying area C) is used in order for an apparatus 10 to set its own address to a value n.

If the apparatus 10 sets its own address to the value n, then the content of the area C is changed to a value (n+N) (where N is a number predetermined by the system) and the command is transferred to the controlled apparatus of the next stage (predetermined processing).

Accordingly, if n=1 and N=1, then television receiver 300, VTRA 500, VTRB 700 and video camera 900 are sequentially set to address 1, address 2, address 3, and address 4.

In that case, since the command for setting the address to the value 5 is fed from apparatus 10 of video camera 900 back to controller 100A, the controller 100A can know the number of the controlled apparatus (value 5−value 1=value 4) on the basis of that command (value 5).

If all the controlled apparatus have the same address in the initial mode, not the broadcast command but the above address is designated (i.e., the content of the area A is employed as the address value) and the command may be transmitted.

As described above, according to this embodiment, after the command is supplied from the controller 100A to the television receiver 300, different addresses are sequentially set in the respective controlled apparatus by the appliance 10. Thus, the addresses can be set very easily.

Figure 7:
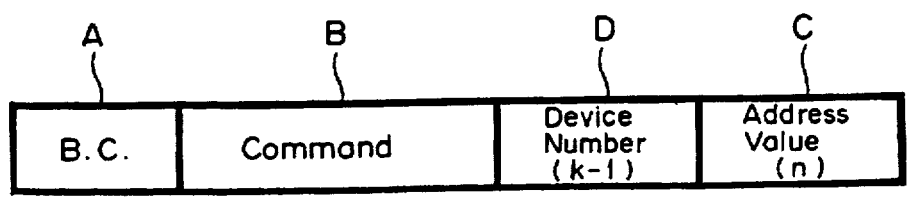
FIG. 7 is a schematic diagram showing an arrangement of a command used in another embodiment of the present invention.

We shall next describe the method for setting the address such that the address of k'th controlled apparatus is set to value n (with reference to FIG. 7). Since the address is not set in an controlled apparatus in which address need not be set, this address setting method is useful for controlling the television receiver 300 and the VTRA 500.

As will be understood from FIG. 7, the command includes a device number (k−1) (which occupies area D) associated with the designated controlled apparatus.

If the content of the area D is value "0", then each of the apparatus 10 identifies that the command transmitted is its own command. If the content of the area D is not "0", then each of the apparatus 10 transfers data in which the content of the area D is added with (−1) to the controlled apparatus of the next stage as the content of the area D.

Accordingly, when such data is transferred (k−1) times, the desired controlled apparatus (k'th controlled apparatus) is specified and the address of that controlled apparatus is set to the value n.

Further, since the address setting data is transmitted to the controller 100A from the controlled apparatus 100 in which the address is set, it is possible to confirm the address setting and the controlled apparatus in which the address is not set.

According to the address setting method of this embodiment, the address setting is performed a time corresponding to the number of the controlled apparatus.

As described above, according to this embodiment, since the desired controlled apparatus is set to a desired address only by transmitting the command thereto from the controller 100A, the address setting operation can be made easier.

In the aforementioned two embodiments, since the content of the processing (i.e., how to change the address n or the like) done by the apparatus 10 can be set at the controller 100A side, various address setting methods become possible.

Furthermore, the apparatus 10 may be utilized as the controller 100A.

As will be understood from the above-mentioned description, according to the address setting method of the present invention, when the address setting signal is supplied to the desired controlled apparatus from the control apparatus, the address setting signal is sequentially processed in a predetermined manner by the controlled apparatus and the controlled apparatus connected to the succeeding stage of the desired control apparatus.

Therefore, the processing for allocating particular addresses to the respective controlled apparatus is introduced into the predetermined processing executed in the respective controlled apparatus, whereby different addresses are allocated to the respective control apparatus. That is, the address can be set by the simple operation of the control apparatus.

Figure 8:
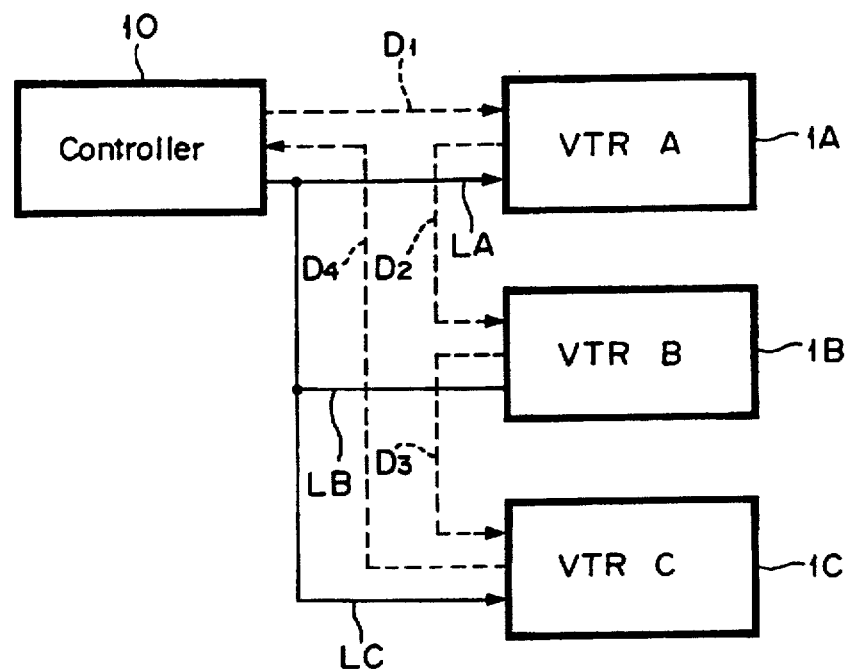
FIG. 8 is a schematic diagram showing an arrangement of a system in which three video tape recorders are connected in series.

Let us now consider the case such that editing is performed by utilizing a system in which three video tape recorders 1A, 1B and 1C whose signal lines for control signal are serially connected are controlled by a controller 10 (as shown in FIG. 8).

In this case, a reset signal from the controller 10 is sequentially and serially transmitted through communication lines $D_1$, $D_2$, and $D_3$ to the video tape recorders 1A, 1B and 1C. From the video tape recorder 1C, such reset signal is fed through a communication line D4 back to the controller 10.

Figure 9:
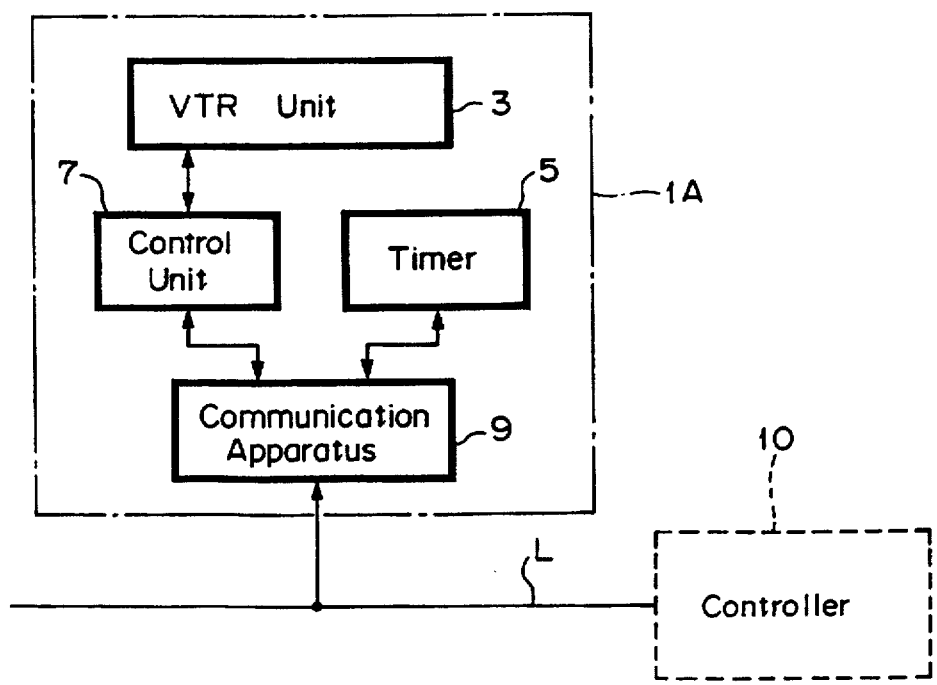
FIG. 9 is a schematic diagram showing a main portion of the system shown in FIG. 8.

FIG. 9 shows an arrangement of the video tape recorder 1A. As shown in FIG. 9, the video tape recorder 1A is comprised of a VTR unit 3, a timer (i.e., time elapse measuring means) 5, a control unit 7 for controlling operation of the video tape recorder 1A or the like, and a communication apparatus 9 which performs the transmission and reception of various signals between it and the external controller 10 such as a personal computer or the like via a communication bus L.

Timer 5 has a resolution of, for example, about a two-hundredth of a second and is arranged such that it is reset to time 0 by the reset signal transmitted from the controller 10 via the communication bus L to output a time in which a reset time is time 0 during a time period of at least several tens of seconds.

The timer 5 may be implemented using either hardware including a quartz oscillator, or software mainly formed of a microcomputer or the like.

The control unit 7 is mainly formed of a microcomputer or the like so that, when supplied with a time and an operation command (for controlling operation of the VTR unit 3) from the controller 10, the control unit 7 executes the command at the above time. The control unit 7 is a control means.

Further, when supplied with a command such as a time code or the like for outputting recording position information of a recording medium (magnetic tape or the like) from the controller 10, the control unit 7 reads (i.e., detects) and outputs the recording position information. Simultaneously, the control unit 7 outputs the read time (output of the timer 5) to the controller 10. Therefore, the control unit 10 is also served as a recording position information outputting means.

The procedure in which editing is performed by utilizing the video tape recorders 1A, 1B shown in FIG. 8 will be described next. In this procedure, video tape recorder 1A performs the reproduction and the video tape recorder 1B performs the recording. Furthermore, the synchronization (i e., horizontal and vertical synchronization) of the video signal system between the video tape recorders 1A, 1B is established similarly to the prior art.

In order to start the reproduction and the recording at the same time, the timer 5 is reset and a command signal indicative of "start playback at time T" is transmitted to the video tape recorder 1A. Also, a command signal indicative of "start recording at time T" is transmitted to the video tape recorder 1B.

Thereafter, the control unit 7 causes the VTR unit 3 to start the reproduction (or recording) at the time T.

If extra time is required in the start of reproduction and/or recording due to the mechanical arrangement or the like, then the time T may be designated in anticipation of such extra time (preparation time).

Accordingly, the time T may be selected to be longer than a sum total of time of the time in which the controller 10 transmits the reset signal, the time in which the controller 10 transmits the command signal to the two video tape recorders 1A and 1B, and the preparation time.

When the video tape recorders 1A and 1B are operated in synchronism with each other, the displacement between time codes (recording position information) must be checked. To this end, the respective timers 5 are reset by the controller 10 and a command (inquiry) for causing the video tape recorder to transmit the time code to the controller 10 is supplied to the video tape recorder 1A. Then, the video tape recorder 1A reads a time code Ca and transmits the time code Ca and a read-out time Ta to the controller 10.

In a like manner, since a time code Cb and a time Tb are transmitted to the controller 10 from the video tape recorder 1B, the controller 10 can understand how much the video tape recorder 1B is advanced from the video tape recorder 1A from a time standpoint.

Further, when data at the portion succeeding to the time code C of the video tape recorder 1A is recorded by the video tape recorder 1B during the video tape recorder 1A reproduces the pre-roll portion while the video tape recorder 1B is in the recording standby mode, the timer 5 is reset initially.

Then, the transmission of the time code is commanded to the video tape recorder 1A by the controller 10 and the video tape recorder 1A transmits the time code Ca and the read time Ta to the controller 10.

Accordingly, when a command signal indicative of "start recording at time (Ta+C−Ca)" is transmitted to the video tape recorder 1B from the controller 10, then the control unit 7 of the video tape recorder 1B causes VTR unit 3 to start the recording operation at that time.

As described above, the apparatus for connecting electronic appliances of this embodiment includes the timer 5 which is reset by the controller 10, and the control unit 7 which performs the designated control at the designated time.

Therefore, high synchronization accuracy (accuracy of the timer 5), necessary for editing or the like, is obtained regardless of the speed of the command signal output from the controller 10 and the information processing speed in the controller 10.

For example, if timer 5 is formed of a quartz oscillator, the operation time of the timer is several tens of seconds after the timer is reset so that the resolution of the timer can be adjusted so as to fall within several microseconds with ease. As a consequence, the synchronization accuracy also can be controlled so as to fall within 1V.

Further, if the time T is designated in anticipation of the operation responsiveness at the video tape recorder 1A side, then it becomes possible to avoid synchronization error caused due to the responsiveness of the video tape recorder 1A.

Furthermore, the control unit may be included within other appliances such as an audio tape recorder or the like, and the appliances for supplying video and audio signals to the control unit may be a variety of AV appliances, electronic musical instruments, etc.

As will be understood from the above description, the control apparatus according to the present invention includes a time elapse measuring means in which the time elapse measurement is started by the reset signal. The time elapse measured by the time elapse measuring means is utilized as the absolute time and the operation of the control apparatus is controlled in accordance with that time.

Also, the recording position information on the record medium is output together with the detected time.

Accordingly, when the operation of the recording apparatus (which can be a video tape recorder or the like) is controlled by an external control apparatus, by merely matching the time points (i.e., inputting the reset signal), the desired operation command can be executed at the desired time by the control apparatus.

As a result, the operation of the control apparatus can be controlled with high accuracy independently of transmission rate of various data transmitted and received between the control apparatus and the external control apparatus and the data processing speed of the external control apparatus.

In addition, if the operation time is determined in a way to account for the responsiveness of the control apparatus, then it becomes possible to avoid the synchronization displacement due caused to due the responsiveness of the control apparatus.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

What is claimed is:

1. A separate control apparatus associated with each one of a plurality of recording and reproducing apparatus, each said control apparatus comprising:
    time elapse measuring means, responsive to an input reset signal determining an input time point, for measuring a time elapse with reference to the input time point;
    a recording position output means, responsive to an input predetermined signal, for detecting and outputting recording position information from a recording medium of a given one of the plurality of recording or reproducing apparatus; and
    a control means for receiving the time elapse measured by said time elapse measuring means, determining an execution time in response to the time elapse, and executing an operation command to the given one of the plurality of recording or reproducing apparatus at said execution time in response to said operation command.

2. A control apparatus according to claim 1, also including control signal lines for serially connecting said plurality of recording and reproducing apparatus.

3. A recording and reproducing system comprising:
    a master controller;
    a plurality of recording and reproducing apparatus;
    a plurality of secondary control apparatus, each secondary control apparatus for respectively controlling the operations of an associated recording and reproducing apparatus of the plurality of recording and reproducing apparatus, with each secondary control apparatus comprising:
        a resettable timer which is reset by a command from the master controller;
        a recording position output means for detecting and outputting recording medium position information from an associated recording and reproducing apparatus; and
        control means for receiving a time elapse measured by the resettable timer, for receiving an execution time and an operation command from the master controller, and for executing the operation command on the associated recording and reproducing apparatus when the time elapse is equal to the execution time.

4. A recording and reproducing system according to claim 3, also including control signal lines for serially connecting the plurality of secondary control apparatus.

* * * * *